Nov. 28, 1939. W. J. POLYDOROFF Re. 21,282

RADIO AMPLIFYING CIRCUITS

Original Filed Aug. 26, 1929 3 Sheets-Sheet 1

INVENTOR
Wladimir J. Polydoroff,
BY
Pennie, Davis, Marvin and Edmonds.
ATTORNEYS Nov. 28, 1939. W. J. POLYDOROFF Re. 21,282

RADIO AMPLIFYING CIRCUITS

Original Filed Aug. 26, 1929 3 Sheets-Sheet 2

INVENTOR
Wladimir J. Polydoroff,
BY
Pennie, Davis, Marvin & Edmonds.
ATTORNEYS

Nov. 28, 1939. W. J. POLYDOROFF Re. 21,282

RADIO AMPLIFYING CIRCUITS

Original Filed Aug. 26, 1929 3 Sheets-Sheet 3

INVENTOR
Wladimir J. Polydoroff,
BY
Pennie, Davis, Marvin and Edmonds.
ATTORNEYS

UNITED STATES PATENT OFFICE 21,282

RADIO-AMPLIFYING CIRCUITS

Wladimir J. Polydoroff, Wilmette, Ill., assignor to Johnson Laboratories, Inc., Chicago, Ill., a corporation of Illinois Original No. 1,940,228, dated December 19, 1933, Serial No. 388,289, August 26, 1929. Application for reissue December 2, 1936, Serial No. 113,943

17 Claims. (Cl. 179—171)

The invention relates to the use of iron or other magnetic materials in radio-frequency and other alternating current circuits. More particularly, the present invention contemplates the use of such materials in tuned radio-frequency amplifying circuits, although the particular new instrumentalities to be described and claimed are not limited in their advantageous application to this particular class of apparatus.

As is well understood in the radio art, a tuned radio-frequency amplifying circuit consists essentially of a relay device such as a thermionic amplifying tube, and an electrically connected resonant circuit consisting of inductance and capacity. This resonant circuit is the portion of the radio-amplifying circuit in which the property of selectivity resides, and it may therefore be referred to as the selective circuit, as distinguished from the complete amplifying circuit including the tube or relay.

Hitherto, many attempts were made to employ iron cores in the transformers used in radio frequency, but owing to great losses introduced by the iron as then employed, efficiency was generally impaired, so that air-core coils and transformers are now exclusively used in the cases where relatively high-frequency oscillations, either modulated or not by voice frequencies, are to be selected and amplified by thermionic tubes and associated circuits.

The invention will be better understood if reference is made to the accompanying drawings where Figure 1 represents a general circuit employing thermionic tubes and embodying the present invention;

Figure 1:
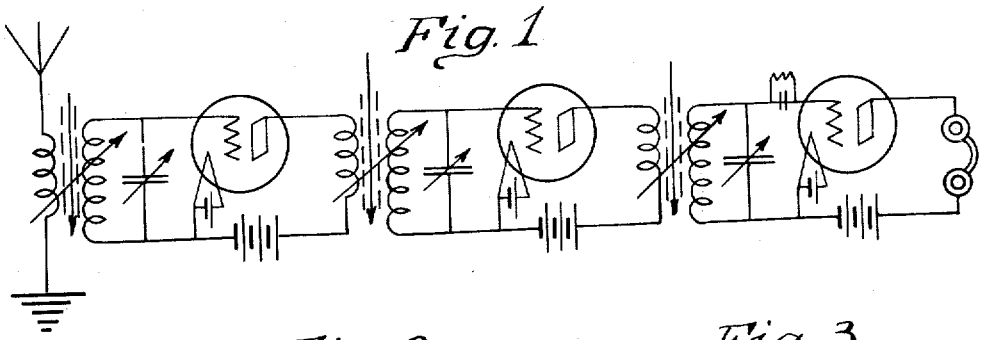

It is usual practice to employ several stages of radio-frequency amplification in cascade, as shown on Figure 1, having variable inductances or capacities, or both, in the tuning circuits, so as to cover a certain band of frequencies, say from 1,500 to 550 kilocycles. Such a wide range of frequencies renders the amplifying circuits inefficient and different in operation at different frequencies.

It is the object of the present invention to improve fidelity, selectivity and efficiency and to secure uniformity of amplification.

Mathematical analysis (Victor G. Smith, Proc. I. R. E. vol. 15, No. 6, June, 1927) shows that the amplification of tuned radio-frequency circuits is represented by the ratio of output to input voltages:

$$\frac{V_o}{V_i}=1/2\frac{\mu}{\sqrt{R_1}}\cdot\frac{\omega L_2}{\sqrt{R_2}}$$

and $$M^2=\frac{Z_1Z_2}{\omega 2}$$

where $$\omega=2\pi f$$

providing the circuit is tuned to the resonance, and optimum coupling between primary and secondary circuits is obtained at each frequency. These formulae prove that with fixed inductance $L_2$, in order to keep the amplification constant, the resistance $R_2$ of the tuned circuit, which is chiefly composed of the coil's resistance, should change proportionately to the square of the frequency.

Figure 2:
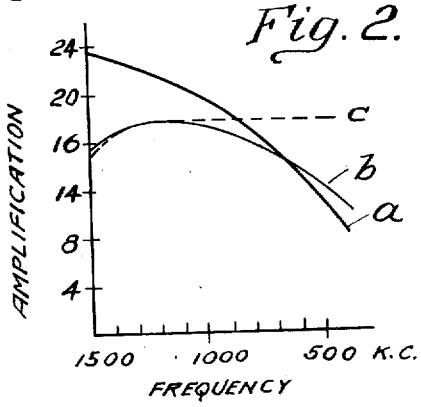
Figure 2 is a diagram showing the amplification of a single stage of such a system.

In the case of a fixed value of mutual inductance, M, the amplification decreases with increase of tuning capacity as represented by the curve *a* of Figure 2, when the mutual inductance is adjusted for the high-frequency end of the frequency band. Mutual inductance can be chosen to be at the optimum value somewhere in the middle of the frequency band as represented by the curve *b* of said figure. In this case, the circuits being over-coupled at high frequency and under-coupled at low frequency, produce non-uniform amplification. The above formulae also prove that in order to keep the mutual inductance at its optimum value throughout the frequency band, the resistance $R_2$ should be so changed as still to be proportional to the square of the frequency.

Figure 3:
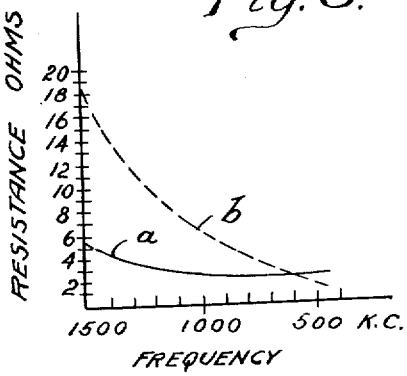
Figure 3 is a diagram showing the resistance variations of various coils.

Actual measurements of the resistance of an air coil or transformer, show that the coil changes its resistance with frequency changes, but not as much as would be required to keep the amplification constant and the mutual inductance at optimum. Curve *a* of Figure 3, shows the resistance for a certain air coil, measured at different frequencies, while curve *b* represents the resistance required to maintain said resistance proportional to the square of frequency.

One object of this invention is to provide radio-frequency circuits with transformers and coils which will not be subject to the described deficiencies of air coils, to thereby attain even amplification with optimum mutual inductance. It has been found that the use of finely powdered iron in the field of an air coil, will change the variation of the resistance of the coil relatively to variations in frequency.

A low-resistance air coil was chosen, and its inductance was materially augmented by powdered iron disposed within said coil. The actual measurements of resistance throughout the entire range of frequencies utilized, shown by the curve *b* of Figure 3, indicate that the resistance changed approximately nine times while the frequency changed approximately three times. Numerous measurements have verified the fact that the resistance of iron-core coils remains proportional to the square of the frequency, despite frequency changes.

Transformers having powdered iron cores, were connected with thermionic tubes and other elements of the circuit of Figure 1, and it was found that the amplification curve remained substantially even throughout the entire range of frequencies, as represented by the curve *c* of Figure 2. Thus, a close agreement with theoretical considerations was established, that is to say, that when resistance varies as the square of the frequency, the amplification of a tuned circuit remains constant and the mutual inductance adjusts itself to optimum value.

The resistances of transformers having powdered-iron cores, being extremely small at 550 k. c. and the lower frequencies, it is possible to build transformers and coils designed for those low frequencies having an L/R ratio much greater than is practical if ordinary air coils are employed. Furthermore, it is possible to reduce the windings and thereby minimize the size of radio-frequency transformers, thus effectuating a saving of space.

Figure 4:
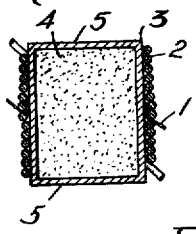
Figures 4, 5, 6, 7 show various modifications of the present invention.

There may be several embodiments of my iron-core coils and transformers, the simplest embodiment being shown in Figure 4 wherein primary and secondary coils 1, 2 are wound on an insulating tube 3, and powdered iron 4 is packed inside the tube 3, and the ends 5 of the tube are sealed.

Figure 5:
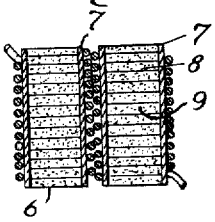

Figure 5 shows schematically a binocular coil 6 wound on insulating tubes 7, portions 8 of the powdered iron being separated by thin paper discs 9, to prevent readjustment of its particles and consequent packing and slight change in inductance.

Iron cores can also be made by mixing various adhesive and insulating compounds with powdered iron, and giving these cores the desired shape with or without pressure. Also, certain other insulators, such as wax, paraffine and mineral oils, may be used. Substances when melted and mixed with iron particles, while hot manifest very small losses but, when cold and solidified, increase the conductivity of iron cores thousands of times and establish easy paths for eddy currents at high frequencies, resulting in a considerable increase in radio-frequency resistance of coils equipped with such cores.

However, a coil having either a melted or an unmelted core of wax, without powdered iron, developed substantially no resistance in the coil, while, when powdered iron was mixed with the wax of said core, the resistance in said core was 5 ohms, if the wax was melted, and was 50 ohms, if the wax was solidified. Also, when the core comprised the same mass and quality of powdered iron the resistance of the coil was 5 ohms.

Other insulators preferably of elastic nature, such as rubber, natural and synthetic gums and certain varnishes mixed with iron and pressed together, will maintain insulating films between the iron particles and, therefore, reduce resultant radio-frequency losses.

The definition "iron" used in the specification should be applied to any other metal or alloy having magnetic properties, such as silicon-iron permalloy and nickel-iron. Various powdered metals were tested for radio-frequency transformers and inductances, and it was found that for the most satisfactory results iron reduced by hydrogen, the particles of which had been sifted through a screen of 300 meshes to the inch, should be used for frequencies between 1500 to 1000 k. c., but that powders containing coarser particles may be used for frequencies below 1000 k. c., and also that the fineness and the force of compression govern the radio-frequency resistance of the coil. Iron produced by hydrogen in the ordinary way contains particles of various sizes some of which may be too large for use in the production of cores suitable for use in radio frequency circuits. It is, therefore, necessary to eliminate the largest particles. The insulating coat of oxide usually present on the surfaces of iron particles, helps to reduce eddy-current losses. When silicon iron powder is used it is practical to chemically treat the powder with a phosphoric acid solution which creates an insulating film.

When, in this specification, "powdered iron" is referred to, I mean either incoherent masses of finely-divided iron, or masses of finely-divided iron compressed into bodies in which the individual particles are held together by an insulating binder, but the degree of compression should not be so great as to cause the particles of powdered iron to touch each other and thus exclude the insulating material which should separate them.

Figure 6:
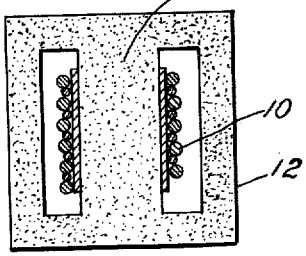

To obtain maximum gain in inductance, thus due to the iron cores, the length of a coil should be preferably twice its diameter, and the wire should be space-wound, such arrangement being shown in Figure 6, wherein 10 indicates a space-wound wire, and 11 indicates the powdered iron core. The inductance may be further augmented if the iron core extends around the outside of the coil in the form of cylinder 12. It will be noted that a space is left between winding 10 and the core extension 12, and that the turns of winding 10 are spaced from the core by an insulating sleeve. Such arrangement of iron completely closes the magnetic lines around the coil, forming an astatic coil. When iron cores are employed in the coils of the closed or semi-closed magnetic field type, the original astatic properties of such coils are greatly enhanced. While the powdered-iron core substantially doubles the individual primary and secondary inductances of a transformer, it increases the mutual inductance between the windings four or five times. This phenomenon is especially advantageous when a very tight coupling is required, or when long solenoids are employed for transformation.

Another object of the present invention is to tune a radio-frequency circuit in a new, simple and efficient manner, a movable powdered iron core disposed in the field of a coil being employed for tuning purposes. Depending on the amount of the iron powder inserted in the form of a core, the self-inductance of a coil may be increased four and even six times with a resulting increase in radio-frequency resistance.

Figure 7:
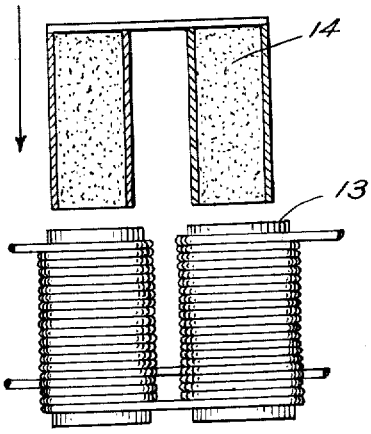
Figure 8:
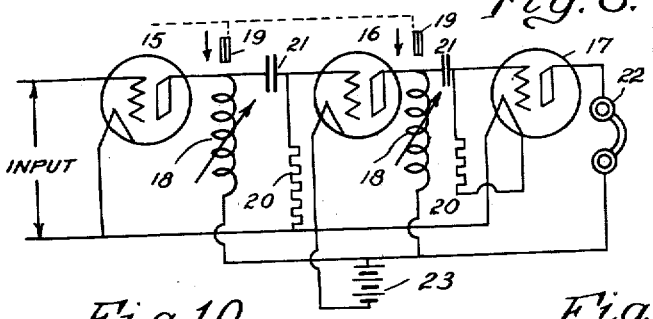
Figure 8 shows one application of the present invention.
Figure 9:
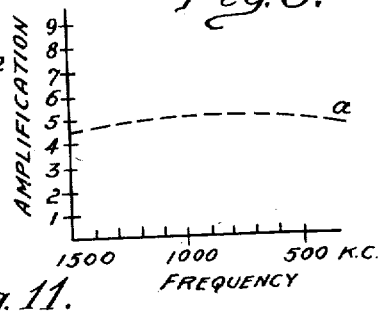
Figure 9 shows the amplification curve of one stage of the circuit, of Figure 8.

Figure 7 shows a binocular transformer 13, having a core 14 which can be moved in and out to obtain variations of self-inductance and mutual inductance. This device is capable of tuning the circuit to a desired frequency when connected with tubes and associated circuits such as shown in Figure 1, or such as are shown in Figure 8 wherein a radio-frequency choke amplifier is represented. In this figure are shown thermionic tubes, 15 and 16, acting as radio-frequency amplifiers, a detector tube 17, choke coils 18 having powdered iron movable cores 19, suitable resistances 20, coupling condensers 21, a telephonic receiver 22, and a plate battery 23, filament-heating means being omitted for simplicity. In this system it is possible to work the amplifier at its full efficiency throughout a given range of frequencies by moving iron cores inward or outward. The amplification per stage is shown by curve *a* of Figure 9. Core movements can be made simultaneous with the movements of the input selector, which selector is usual to secure the necessary selectivity for wave lengths of different broadcasting stations.

Figure 10:
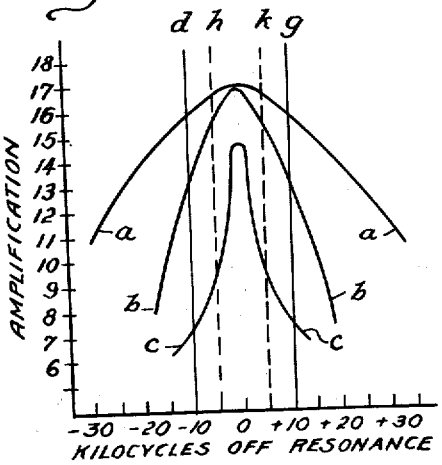
Figures 10, 11, 12 and 13 show selectivity curves of amplifiers of various designs.
Figure 11:
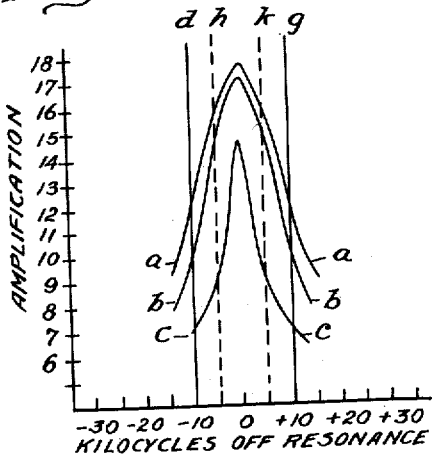
Figure 12:
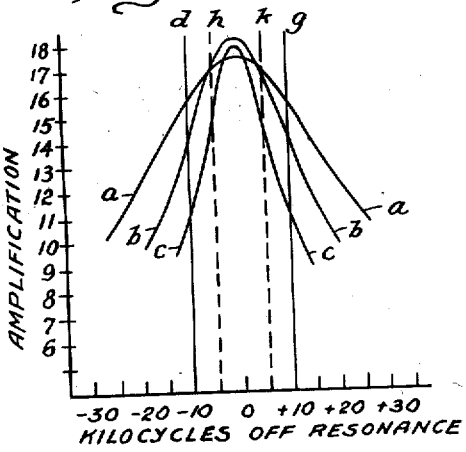

When the selecting of a signal accompanies amplification, as in the cascade radio-frequency amplifier shown in Figure 1, the ability to select is called "selectivity" of tuned circuits. In an ordinary air-core transformer associated with a thermionic amplifier, selectivity varies with frequency. Actual measurements, made for a circuit having L-180 microhenrys variable capacity from 10 to 500 micro-microfarads and total resistance of the circuit varying from 7 to 4 ohms, are shown in Figure 10, wherein, the amplification is plotted against kilocycles off of resonance. Curve *a* is taken at a frequency of 1400 k. c., curve *b* at 100 k. c., and curve *c* at 600 k. c. Vertical lines *d* and *g* are drawn at 10 k. c. off of resonance and represent interfering adjacent stations. Curve *a* shows inadequate selectivity due to high resistance of the circuit and to lack of capacity. As frequency decreases, the resistance decreases the result being sharpening of the curves *b* and *c* representing selectivity. By decreasing the inductance and the losses in the circuit and increasing the initial amount of tuning capacity, it is possible to obtain sharper curves as shown in Figure 11. These three curves *a*, *b* and *c*, represent a very satisfactory selectivity, the amplitudes, as shown, being different because of fixed mutual inductance. The curves of Figure 12 represent the selectivity obtained from a transformer, equipped with a fixed powdered-iron core as hereinbefore described.

As the radio frequency signal is usually modulated by voice frequencies, three frequencies $f_o$, $f_o-f_v$, and $f_o+f_v$, where $f_o$ is carrier frequency, $f_v$ is voice frequency, have to be passed through a selective circuit with substantially equal intensities in order to avoid distortion. To secure intelligible audio signals, it is usual to modulate carrier frequency with voice frequencies ranging from 0 to 5000 cycles, and, therefore, selective circuits should be capable of passing a band of frequencies 10 kilocycles wide, to obtain the fidelity of reproduction. Two vertical dotted lines *h* and *k* in Figures 10, 11 and 12, represent the limits of audio-frequency modulations to be passed through each selective circuit. Referring back to Figure 10, one can easily perceive that curve *a* shows almost perfect fidelity, curve *b* shows slightly distorted fidelity, the extreme side bands being attenuated about 15% as compared with carrier frequency, and curve *c* shows 50% attenuation of its side bands and, therefore, introduces distortion. Curve *a* of Figure 11 shows good fidelity, but curves *b* and *c* show distortion. Comparison of these curves with curves obtained by the use of powdered-iron core transformers, shows that all of the curves of Figure 12 have very good fidelity, and poor selectivity. It is therefore essential for good selectivity and fidelity, throughout the entire frequency range to combine the selectivity of a low-loss high-capacity circuit at high frequency with the selectivity and fidelity obtained by powdered-iron cores at low frequency.

An amplifier was constructed with low-loss, low-inductance coils and a movable powdered-iron core and included in the circuit shown by Figure 1. Tuned to high-frequency signals, such as 1500–1200 k. c., said core was entirely withdrawn and the amplifier then developed the characteristics of the curve *a* of Figure 11. From any high-frequency between 1500 and 1200 k. c., to 550 k. c., said core was gradually moved inside the coil, and, due to increases of self and mutual inductances and of radio-frequency resistance, the curves became broad. The resultant group of curves, taken at three different frequencies, is separately represented in Figure 13 and shows substantially the same selectivity and fidelity throughout the entire range of frequencies.

As it is customary to express the selective properties in terms of band widths in kilocycles at half amplitude, I have chosen to call this quantity the "selectance" and have used this word in this sense in the appended claims. As determined from Figure 13, the selectance is of the order of 30 k. c., slightly varying at three investigated frequencies. Theoretical analysis of a resonant circuit indicates that selectance expressed in band width is directly proportional to $$\frac{R}{L}$$

where R and L are, respectively, resistance and inductance of the circuit, selectance being somewhat impaired by the effects of the plate electrode of an associated thermionic amplifier, should an amplifying stage be employed. The fact that the selectances are substantially equal at three investigated frequencies, indicates that $$\frac{R}{L}$$

was kept substantially constant.

Figure 13:
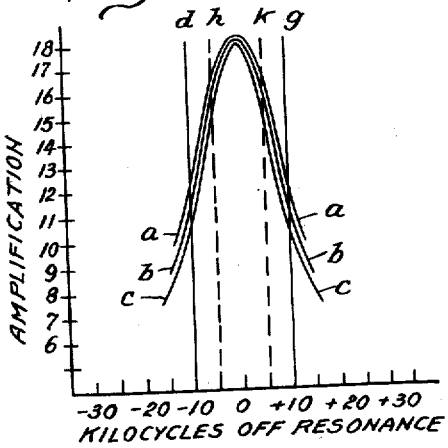
Figure 14:
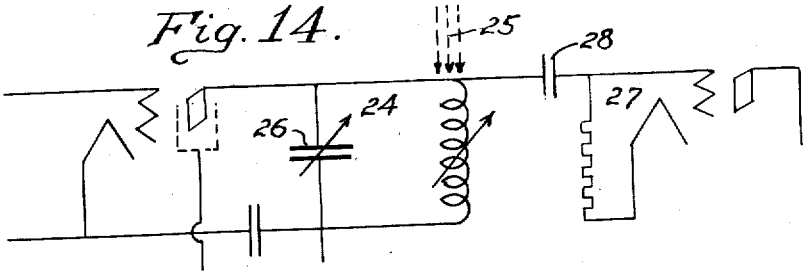
Figures 14 and 15 show modifications of the invention.
Figure 15:
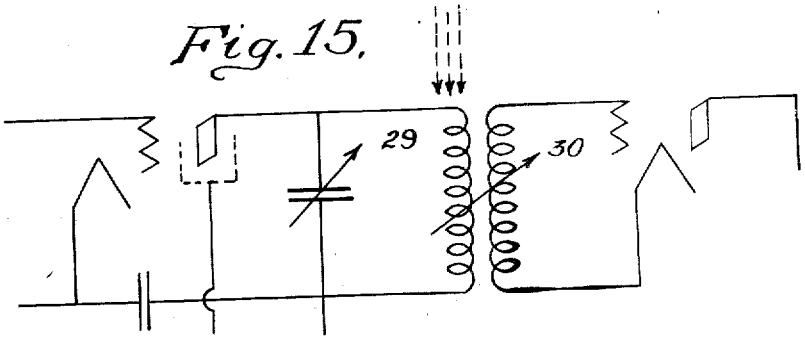

The equal amplifications represented in Figure 13 at three different frequencies, are easily explained if reference is made to Figure 14 wherein one amplifying stage is shown with a tuned circuit 24 directly connected with the plate of a thermionic amplifier, said circuit consisting of an inductance made variable by an iron core and an adjustable condenser 26, the output voltage of said amplifier being fed to a succeeding thermionic amplifier through a condenser 28 and a grid resistance 27. Figure 15 shows essentially the same circuit 24 at 29, with the exception that output voltage is fed through an additional winding 30 unitarily coupled, to the inductance of the tuned circuit 29.

The amplification may be theoretically expressed as $$\frac{V_o}{V_i}=\mu\frac{R_o}{R_1+R_o}$$

where $\mu$ is the amplification factor and $R_1$ the plate resistance of the thermionic amplifier, and $R_o$ the dynamic resistance of the circuit 24, in resonance to $$\frac{L}{RC}$$

of the circuit. As the inductance L is varied for tuning, the resistance R of the circuit, resulting from the coil resistance and iron core losses, should proportionately vary so as to maintain $$\frac{L}{R}$$

with the resultant $R_o$ and $$\frac{V_o}{V_i}$$

constant.

In case of simultaneous variation of capacity and inductance, the amplification of such a circuit can be represented by the above formulae modified as follows:

$$\frac{V_o}{V_i}=1/2\frac{\mu}{\sqrt{R_1}}\sqrt{\frac{L_2}{R_2C_2}}$$

and $$M^2=\frac{Z_1Z_2}{\omega^2}$$

where $$\omega=2\pi f$$

and where the ratio $$\frac{L_2}{R_2C_2}$$

is the dynamic resistance of the circuit at resonance. In addition to the change of value of $L_2$ and $C_2$, $R_2$ is also varied by the movement of the iron core. By properly designing the low-loss coils, and properly choosing the quantity, fineness of and pressure on the iron, as well as adjusting the movement of the iron core in conjunction with other tuning elements, amplification may be kept constant.

Using loose coupling between the primary and secondary circuits, it was found favorable to vary the mutual inductance to a very large extent, so that at high frequencies the primary and secondary circuits were under-coupled while at low frequencies they were over-coupled, these variations being produced automatically by the said movements of the iron core.

When movable iron cores are used for tuning purposes in conjunction with other variable devices, such as variable condensers, variable inductances, variometers and the like, the movements of iron cores should be correlated with the movements of said variable devices. It is preferable to so adjust the cores that, at the higher frequencies, the iron is kept away from the coils. As the frequency decreases, the iron cores should be gradually inserted into the coils, with a constant or an accelerated speed, depending on the design of other tuning devices employed.

Figure 16:
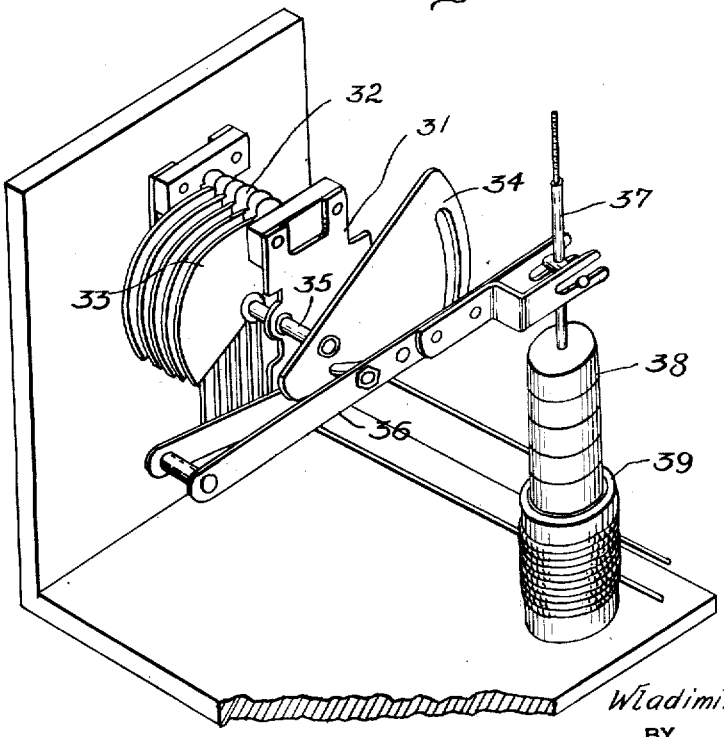
Figure 16 shows a tuning device including correlated elements.

Figure 16 shows a selective device embodying a movable iron core which can be used in connection with amplifying circuits, such as shown in Figures 1, 14 and 15. A variable condenser 31 having stationary plates 32 and rotary plates 33, carries a grooved cam 34 firmly connected with the shaft 35. A lever 36, engaging the cam groove, actuates a vertical rod 37 to which a powdered-iron core 38 is fixed. A transformer 39, which may be an impedance coil, telescopically receives said core 38. When the condenser plates are rotated for tuning purposes, the cam 34, its lever 36 and the vertical rod 37 are set in motion, so that the core 38 travels inward and outward relatively to the coil 39. When the condenser plates 33, are out, the core 38 is all the way out, which position corresponds to a higher-frequency limit of the circuit. When the plates 33 are in, the core 38 is in the coil and this position corresponds to a lower-frequency limit. The movements of the core in relation to the rotation of the condenser plates is governed by the curvature of the cam 34. It is possible to move the core 38 proportionally to the angular movement of the rotary plates, in which case the condenser plates may be so shaped as to give the desired capacity variations. However, it is preferable to employ semi-circular plates producing straight-line capacity variations, and to so choose the curvature of the cam 34 that the speed of the core will be accelerated relatively to that of the rotary plates 33 of the condenser. This train of elements admits of a slow movement of the core 38 when said plates are having their initial angular motion, but causes a gradual acceleration of the speed of the core 38 which reaches its maximum when the plates 32 and 33 coincide. Such combination of semi-circular plates with a progressively moving core, effectuates the production of equally wide frequency channels throughout the entire range of the selector.

Having thus described my invention, what I claim is:

1. A radio-frequency amplifying circuit including a vacuum-tube relay device and a selective resonant circuit operable over a range of frequencies, such as 600 to 1400 kilocycles, electrically connected to the output terminals of said relay device and having a coil of relatively lower inductance than in conventional resonant circuits tuned solely by capacitance variation and of low inherent high-frequency resistance at frequencies within the range, an external condenser of appropriately high capacitance connected across said coil, the electrical values of said coil and said condenser being such as to give said resonant circuit a favorable ratio of inductance to resistance at a particular frequency at the upper end of the range and to resonate at said frequency, and means comprising a compressed ferromagnetic core body for tuning said resonant circuit to a materially lower frequency in the lower end of the range and for producing resistance increases in said resonant circuit to substantially maintain said ratio, as the core body is disposed within said coil, said core body having insulated magnetic particles of such quality, quantity, sizes, and nature of insulation and being so compressed that said amplifying circuit has a resonant gain and selective properties substantially the same as when said core body is withdrawn.

2. A high-frequency selective resonant circuit for use over a range of frequencies, such as 600 to 1400 kilocycles, including a condenser of relatively higher capacitance and a coil of relatively lower inductance than in conventional resonant circuits tuned solely by capacitance variation, said coil having low inherent high-frequency resistance at frequencies within the range, the electrical values of said coil and said condenser being such as to give said circuit a favorable ratio of inductance to resistance at a particular frequency at the upper end of the range and to resonate at said frequency, and means comprising a ferromagnetic core body having insulated magnetic particles and being movable relatively into said coil and whose resistance-increasing effect is substantially equal to its inductance-increasing effect, by reason of the correlation of the quality, quantity, sizes and nature of insulation of said particles, for tuning the circuit, by movement of said core body into said coil, to a materially lower frequency in the lower end of the range, whereby said ratio of inductance to resistance, and hence the resonant gain and selectivity of said circuit, is substantially maintained.

3. That method of tuning a selective high-frequency circuit having inductance, capacity and resistance and having desired characteristics at a given frequency, which consists in simultaneously varying said inductance and said resistance of said selective circuit by magnetic means comprising a magnetic body having insulated magnetic particles so as to resonate the circuit to a substantially different frequency while maintaining said desired characteristics.

4. That method of tuning a selective high-frequency system, having a plurality of resonant circuits each including inductance, capacity and resistance, which consists in simultaneously varying said inductance and said resistance in said resonant circuits, by magnetic means comprising a magnetic body having insulated magnetic particles, to thereby tune said system from an upper frequency to a lower frequency while maintaining the resonant response of the system substantially the same at both of said frequencies.

5. A radio-frequency amplifying circuit including a vacuum-tube relay device and a selective resonant circuit operable over a range of frequencies, such as 600 to 1400 kilocycles, electrically connected to working terminals of said relay device and having a coil of relatively lower inductance than in conventional resonant circuits tuned solely by capacitance variation and of low inherent high-frequency resistance at frequencies within the range, an external condenser of appropriately high capacitance connected across said coil, the electrical values of said coil and said condenser being such as to give said resonant circuit a favorable ratio of inductance to resistance at a particular frequency at the upper end of the range and to resonate at said frequency, and means comprising a compressed ferromagnetic core body for tuning said resonant circuit to a materially lower frequency in the lower end of the range and for producing resistance increases in said resonant circuit to substantially maintain said ratio, as the core body is disposed within said coil, said core body having insulated magnetic particles of powdered iron of such quality, quantity, sizes, and nature of insulation and being so compressed that said amplifying circuit has a resonant gain and selective properties substantially the same as when said core body is withdrawn.

6. A radio-frequency amplifying circuit including a vacuum-tube relay device and a selective resonant circuit operable over a range of frequencies, such as 600 to 1400 kilocycles, electrically connected to working terminals of said relay device and having a coil of relatively lower inductance than in conventional resonant circuits tuned solely by capacitance variation and of low inherent high-frequency resistance at frequencies within the range, an external condenser of appropriately high capacitance connected across said coil, the electrical values of said coil and said condenser being such as to give said resonant circuit a favorable ratio of inductance to resistance at a particular frequency at the upper end of the range and to resonate at said frequency, and means comprising a compressed ferromagnetic core body for tuning said resonant circuit to a materially lower frequency in the lower end of the range and for producing resistance increases in said resonant circuit to substantially maintain said ratio, as the core body is disposed within said coil, said core body having insulated magnetic particles of hydrogen iron of sizes small enough to pass through a screen having 300 meshes to the inch, and of such quantity and nature of insulation and being so compressed that said amplifying circuit has a resonant gain and selective properties substantially the same as when said core body is withdrawn.

7. A high-frequency selective resonant circuit for use over a range of frequencies, such as 600 to 1400 kilocycles, including a condenser of relatively higher capacitance and a coil of relatively lower inductance than in conventional resonant circuits tuned solely by capacitance variation, said coil having low inherent high-frequency resistance at frequencies within the range, the electrical values of said coil and said condenser being such as to give said circuit a favorable ratio of inductance to resistance at a particular frequency at the upper end of the range and to resonate at said frequency, and means comprising a compressed ferromagnetic core body having insulated magnetic particles and being movable relatively into said coil and whose resistance-increasing effect is substantially equal to its inductance-increasing effect, by reason of the correlation of the quality, quantity, sizes and nature of insulation of said particles, and the degree of compression of said core body, for tuning the circuit, by movement of said core body into said coil, to a materially lower frequency in the lower end of the range, whereby said ratio of inductance to resistance, and hence the resonant gain and selectivity of said circuit, is substantially maintained.

8. A high-frequency selective resonant circuit for use over a range of frequencies, such as 600 to 1400 kilocycles, including a condenser of relatively higher capacitance and a coil of relatively lower inductance than in conventional resonant circuits tuned solely by capacitance variation, said coil having low inherent high-frequency resistance at frequencies within the range, the electrical values of said coil and said condenser being such as to give said circuit a favorable ratio of inductance to resistance at a particular frequency at the upper end of the range and to resonate at said frequency, and means comprising a ferromagnetic core body having insulated metallic-iron particles and being movable relatively into said coil and whose resistance-increasing effect is substantially equal to its inductance-increasing effect, by reason of the correlation of the quantity, sizes, and nature of insulation of said particles, for tuning the circuit, by movement of said core body into said coil, to a materially lower frequency in the lower end of the range, whereby said ratio of inductance to resistance, and hence the resonant gain and selectivity of said circuit, is substantially maintained.

9. A high-frequency selective resonant circuit for use over a range of frequencies, such as 600 to 1400 kilocycles, including a condenser of relatively higher capacitance and a coil of relatively lower inductance than in conventional resonant circuits tuned solely by capacitance variation, said coil having low inherent high-frequency resistance at frequencies within the range, the electrical values of said coil and said condenser being such as to give said circuit a favorable ratio of inductance to resistance at a particular frequency at the upper end of the range and to resonate at said frequency, and means comprising a compressed ferromagnetic core body having insulated hydrogen-iron particles of sizes small enough to pass through a screen having 300 meshes to the inch and being movable relatively into said coil and whose resistance-increasing effect is substantially equal to its inductance-increasing effect, by reason of the correlation of the quantity and nature of insulation of said particles, and the degree of compression of said core body, for tuning the circuit, by movement of said core body into said coil, to a materially lower frequency in the lower end of the range, whereby the ratio of inductance to resistance, and hence the resonant gain and selectivity of said circuit, is substantially maintained.

10. A high-frequency selective resonant circuit for use over a range of frequencies, such as 600 to 1400 kilocycles, including an adjustable external condenser of relatively higher capacitance and a low-loss space-wound solenoidal coil of length not less than twice its diameter and of relatively lower inductance, than in conventional resonant circuits tuned solely by capacitance variation, the electrical values of said coil and said condenser being such as to give said circuit a favorable ratio of inductance to resistance at a particular frequency at the upper end of the range and to resonate at said frequency, and means comprising a compressed ferromagnetic core body having insulated magnetic particles and of a diameter and length closely equal to the internal diameter and length of said coil and being movable relatively into said coil and whose resistance-increasing effect is substantially equal to its inductance-increasing effect, by reason of the correlation of the quality, quantity, sizes, and nature of insulation of said particles, for tuning the circuit, by movement of said core body into said coil, to a materially lower frequency in the lower end of the range, whereby said ratio of inductance to resistance, and hence the resonant gain and selectivity of said circuit, is substantially maintained.

11. That method of tuning and controlling a selective high-frequency resonant circuit over a range of frequencies, such as 600 to 1400 kilocycles, said circuit having inductance, capacitance and resistance and a favorable ratio of inductance-to-resistance characteristic at a given frequency at the upper end of the range, which consists in employing relatively higher capacitance and relatively lower inductance than in conventional resonant circuits tuned solely by capacitance variation, and with the inductance of low inherent high-frequency resistance, to secure said favorable ratio of inductance to resistance in said circuit at said frequency and to resonate at said frequency; tuning said circuit to a materially lower frequency in the lower end of the range by ferromagnetically increasing the inductance thereof; and simultaneously ferromagnetically introducing substantially proportional increases in the high-frequency resistance of said circuit, to substantially maintain said ratio of inductance to resistance in said circuit in the lower end of the range, whereby the resonant gain and selectivity of said circuit are each substantially maintained the same at both said frequencies.

12. That method of tuning and controlling a selective high-frequency system having a plurality of resonant circuits each including inductance, capacitance and resistance, over a range of frequencies such as 600 to 1400 kilocycles, and simultaneously maintaining predetermined selectivity and fidelity therein, which consists in combining in each of said resonant circuits the selectivity of a low-loss high-capacitance circuit at high frequencies, with the selectivity and fidelity of a circuit having a powdered-iron core at lower frequencies, by employing relatively higher capacitance and relatively lower inductance than in conventional resonant circuits tuned solely by capacitance variation, and with the inductance of low inherent high-frequency resistance, to secure a favorable ratio of inductance to resistance in each of said circuits at a frequency at the upper end of the range, and to resonate at said frequency; tuning each of said circuits to a materially lower frequency in the lower end of the range by ferromagnetically increasing the inductance thereof, and simultaneously ferromagnetically introducing increases in the high-frequency resistances of said circuits to substantially maintain said ratio of inductance to resistance in each of said circuits, whereby the resonant gain of said system is substantially maintained.

13. That method of tuning and controlling a high-frequency selective system over a range of frequencies, such as 600 to 1400 kilocycles, including a selective resonant circuit having inductance, capacitance and resistance and a favorable ratio of inductance-to-resistance at a given frequency at the upper end of the range, which consists in employing relatively higher capacitance and relatively lower inductance than in conventional resonant circuits tuned solely by capacitance variation, and with the inductance of low inherent high-frequency resistance, to secure said favorable ratio of inductance to resistance in said resonant circuit at said frequency and to resonate at said frequency; inductively associating a winding with the said inductance to couple said inductance to an external circuit; tuning said resonant circuit to a materially lower frequency in the lower end of the range by ferromagnetically increasing the inductance thereof, and simultaneously ferromagnetically introducing increases in the high-frequency resistance of said circuit to substantially maintain said ratio, and varying the coupling between the associated winding and the said inductance, whereby the selective properties of said system are substantially maintained.

14. A radio-frequency amplifying circuit including a vacuum-tube relay device and a selective resonant circuit operable over a range of frequencies, such as 600 to 1400 kilocycles, electrically connected to working terminals of said relay device and having a coil of relatively lower inductance than in conventional resonant circuits tuned solely by capacitance variation, and of low inherent high-frequency resistance at frequencies within the range, an external condenser of appropriately high capacitance connected across said coil, the electrical values of said coil and said condenser being such as to give said resonant circuit a favorable ratio of inductance to resistance at a particular frequency at the upper end of the range and to resonate at said frequency, a winding inductively related to said coil to couple said amplifying circuit to an external circuit, and means comprising a compressed ferromagnetic core body for tuning said resonant circuit to a materially lower frequency in the lower end of the range, for varying the coupling between said winding and said coil, and for producing resistance increases in said resonant circuit to substantially maintain said ratio, as the core body is disposed within said coil, said core having insulated magnetic particles of such quality, quantity, sizes, and nature of insulation and being so compressed that said amplifying circuit has resonant gain and selective properties substantially the same as when said core body is withdrawn.

15. A high-frequency selective resonant circuit for use over a range of frequencies, such as 600 to 1400 kilocycles, including a condenser of relatively higher capacitance and a coil of relatively lower inductance than in conventional resonant circuits tuned solely by capacitance variation, said coil having low inherent high-frequency resistance at frequencies within the range, the electrical values of said coil and said condenser being such as to give said circuit a favorable ratio of inductance to resistance at a particular frequency at the upper end of the range and to resonate at said frequency, and means comprising a ferromagnetic core body having insulated magnetic particles and being movable relatively into said coil and whose resistance-increasing effect is at the most equal to its inductance-increasing effect, by reason of the correlation of the quality, quantity, sizes, and nature of insulation of said particles, for tuning the circuit, by movement of said core body into said coil, to a materially lower frequency in the lower end of the range, whereby said ratio of inductance to resistance, and hence the resonant gain and selectivity of said circuit, is not decreased.

16. A radio-frequency amplifying circuit including a vacuum-tube relay device and a selective resonant circuit operable over a range of frequencies, such as 600 to 1400 kilocycles, electrically connected to working terminals of said relay device and having a coil of low inherent high-frequency resistance at frequencies within the range, an external condenser connected across said coil, the electrical values of said coil and said condenser being such as to give said resonant circuit a favorable ratio of inductance to resistance at a particular frequency at the upper end of the range and to resonate at said frequency, and means comprising a compressed ferromagnetic core body for tuning said resonant circuit to a materially lower frequency in the lower end of the range and for producing simultaneously resistance increases in said resonant circuit to substantially maintain said ratio, as the core body is disposed within said coil, said core body having insulated magnetic particles of such quality, quantity, sizes, and nature of insulation and being so compressed that said amplifying circuit has a resonant gain and selective properties substantially the same as when said core body is withdrawn.

17. A high frequency selective resonant circuit for use over a range of frequencies, such as 600 to 1400 kilocycles, including inductance, capacitance, and resistance, said circuit having desired characteristics as determined by its inductance to resistance ratio at a given frequency at the upper end of the range and being resonant at said frequency, and means comprising a ferromagnetic core body having insulated particles for tuning said circuit to a materially lower frequency in the lower end of the range and for producing simultaneously resistance increases in said circuit to substantially maintain said ratio whereby said circuit will resonate at substantially different frequencies while maintaining said desired characteristics.

WLADIMIR J. POLYDOROFF.

CERTIFICATE OF CORRECTION.

Reissue No. 21,282. November 28, 1939.

WLADIMIR J. POLYDOROFF.

It is hereby certified that error appears in the printed specification of the above numbered patent requiring correction as follows: Page 3, first column, line 44, for "100 k. c." read 1000 k. c.; page 4, first column, line 9, before the word "to" insert equal; and that the said Letters Patent should be read with this correction therein that the same may conform to the record of the case in the Patent Office.

Signed and sealed this 16th day of January, A. D. 1940.

Henry Van Arsdale,
Acting Commissioner of Patents.

(Seal)